US012728551B2

(12) United States Patent
Stills

(10) Patent No.: US 12,728,551 B2
(45) Date of Patent: Sep. 8, 2026

(54) FOLDING KNIFE WITH ACOUSTIC RESONATOR

(71) Applicant: Douglas Scott Stills, Arden, NC (US)

(72) Inventor: Douglas Scott Stills, Arden, NC (US)

(*) Notice: Subject to any disclaimer, the term of this patent is extended or adjusted under 35 U.S.C. 154(b) by 79 days.

(21) Appl. No.: 18/828,040

(22) Filed: Sep. 9, 2024

(65) Prior Publication Data

US 2025/0114954 A1 Apr. 10, 2025

Related U.S. Application Data

(60) Provisional application No. 63/543,225, filed on Oct. 9, 2023.

(51) Int. Cl.
*B26B 1/04* (2006.01)

(52) U.S. Cl.
CPC .................................... *B26B 1/044* (2013.01)

(58) Field of Classification Search
CPC ........... B26B 1/044; B26B 1/046; B26B 1/02; B26B 5/00; B26B 5/002
USPC ........................... 30/161, 160, 155, 123, 331
See application file for complete search history.

(56) References Cited

U.S. PATENT DOCUMENTS

| | | | | |
|---|---|---|---|---|
| 6,490,797 B1 * | 12/2002 | Lake | B26B 1/044 30/160 |
| 7,676,932 B2 | 3/2010 | Grice | |
| 8,413,338 B2 | 4/2013 | Freeman | |
| 9,457,483 B2 | 10/2016 | Wu et al. | |
| 2004/0187313 A1 * | 9/2004 | Zirk | B43L 23/08 362/119 |
| 2008/0086894 A1 * | 4/2008 | Sullivan | B26B 5/00 30/155 |

FOREIGN PATENT DOCUMENTS

SE 462148 B * 5/1990 ............... B26B 1/02

* cited by examiner

*Primary Examiner* — Ghassem Alie
(74) *Attorney, Agent, or Firm* — JK Intellectual Property Law, PA

(57) ABSTRACT

An acoustic resonator is cut, formed, or milled into the frame, or attached to the frame, of a folding knife to any dimensional specifications that support vibration at a desired sound effect frequency. The sound effect, sometimes referred to as “shwing”, “schwing”, “ting” or “ping”, is acoustically similar to the sound effect a Samurai makes when pulling his sword from its sheath or when he strikes another sword.

13 Claims, 7 Drawing Sheets

FOLDING KNIFE WITH ACOUSTIC RESONATOR

CROSS-REFERENCE TO RELATED APPLICATIONS

The present invention claims priority to U.S. Provisional Patent Application No. 63/543,225 filed Oct. 9, 2023, incorporated herein by reference in its entirety.

FIELD OF THE INVENTION

The disclosure relates to the field of folding knives. More specifically the present invention comprises a folding knife with a mechanism for creating an audible acoustic sound in response to opening and closing the blade of the knife, sometimes referred to as a "shwing", "schwing", "ting" or "ping".

BACKGROUND OF THE INVENTION

Folding knives are invaluable tools that are used in many aspects of everyday life, and there are many, many types and styles of folding knives. A "manual" folding knife is a very traditional type of tool in which the knife blade is manually movable by the user between a closed or stowed position in which the sharp edge of the blade is held safely within the handle scale, and an open position in which the blade is extended in an operable position. Most modern versions of manually operated folding knives include locking mechanisms that lock the blade in the open position—the safety benefits of such locks are obvious. There are innumerable variations on these basic themes.

Retractable knives, those knives that have blades that retract into the frame of the particular knife, come in a variety of shapes and sizes. Retractable knives fall into one of two broad categories. Some knives feature a blade which is retracted into and extended from its frame in a straight fashion. These knives are often referred to as stilettos. Stilettos utilize a spring to eject the blade from the frame when a button is pressed. Most jurisdictions prohibit the sale and possession of these types of knives.

A second type of retractable knife is the folding variety. These types of knives are commonly referred to as folding knives or pocket knives. Folding knives have blade which is pivotally connected to its frame at one end. The blade pivots between an open position where the blade is extended out from the frame and a closed position where the blade rests within the pocket of the frame. Many folding knives are manual in that folding and unfolding of the blade is performed entirely by the user. Other folding knives are spring assisted where a spring assists in unfolding of the blade from the frame.

Most folding knives, whether manual or automatic, incorporate some kind of a mechanism that holds the blade or working implement in the closed position in which the sharp edge of the blade is held safely within the handle scale. There are many known mechanisms for retaining blades in a closed position, and there are obvious reasons why such mechanisms are used. Among other reasons, blade-retaining mechanisms prevent unintended opening of the knife and thus promote safety. As noted, most folding knives also include mechanisms that lock the blade in the open position, again, primarily as a safety feature. There are many different types of these locks. For example, a frame lock knife is one without liners whose lock utilizes a cut away portion of the frame to form a leaf spring and function in the same way as a liner lock wherein the frame locks the knife blade in open position.

The sound of opening a folding knife has been the same "thud" since they were first made. In the knife-making and collecting community, there hasn't been much innovation, especially with the acoustics of a knife. Thus, a need exists for knives that use the acoustic properties of knife materials and construction to enhance their desirability and performance and also help identify the type and maker of a particular knife.

SUMMARY OF THE INVENTION

A folding knife with a frame having a first side, a second side, an open top leading to a pocket, a bottom, a first end, a second end, and a center section therebetween; wherein at least one acoustic resonator is disposed with the frame and positioned adjacent a stop pin disposed proximate the second end of the frame; the stop pin being in vibrational contact with the first side and the second side of the frame. The folding knife also has a blade having a pointed end and a base end, the base end pivotally secured to the second end of the frame such that the blade is capable of pivoting between a closed position wherein the blade is received within the pocket and an open position wherein the blade pivots out of the pocket through the open top and extends outwardly from the second end of the frame. The folding knife also has a frame lock having a first end, a second end, and a center section therebetween; the frame lock second end protruding towards the open top of the frame; the frame lock pivotably integrated with the frame at a pivot notch proximate the center section of the frame. The at least one acoustic resonator is configured to vibrate and produce an audible shwing sound effect in response to impact of the blade with the stop pin.

A method of making at least one acoustic resonator in a folding knife is disclosed herein using the following steps. First, locating the stop pin hole in the frame and drawing at least two parallel lines on each side of the frame at least 1/16 of an inch away from the stop pin. Then, cutting out the entire length of the at least two parallel lines completely through both sides of the frame to leave at least one acoustic resonator cantilevered therebetween. Then, thinning down the at least one acoustic resonator material between the at least two lines to a desired thickness configured for vibrating and generating an audible shwing sound effect.

DETAILED DESCRIPTION

Figure 1:
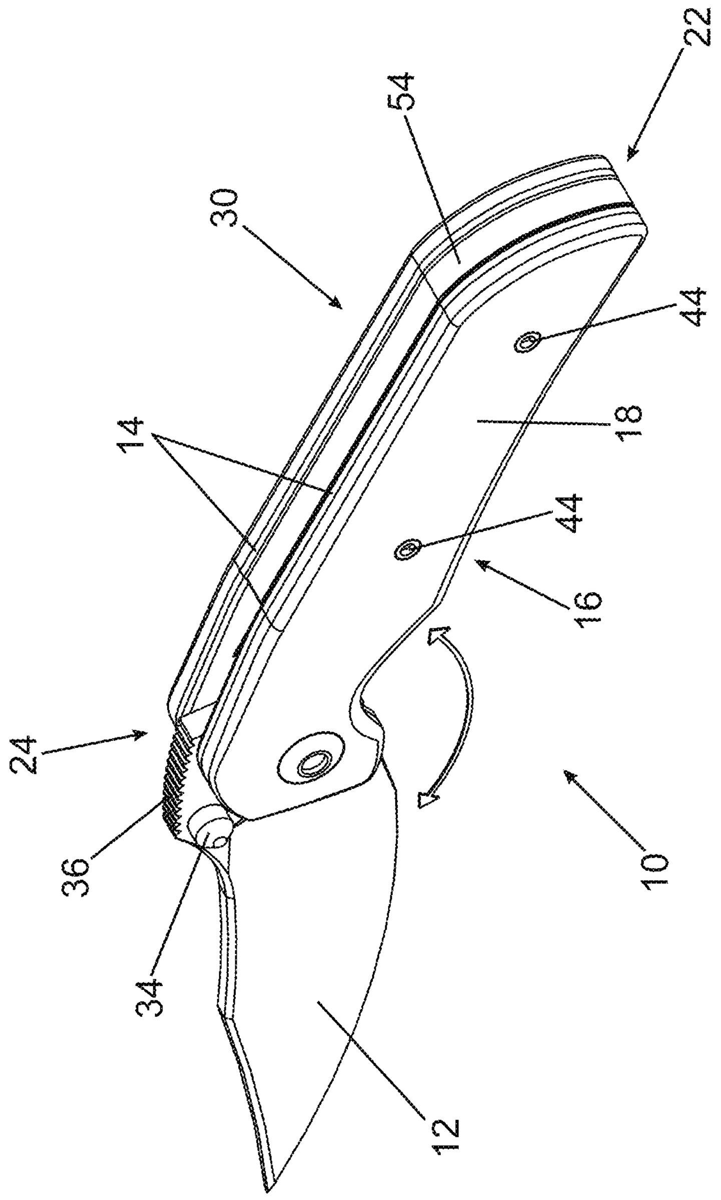
FIG. 1 illustrates a perspective view of a typical folding knife with acoustic resonator.

The invention will be described with reference to the figures which are integral, but non-limiting, part of the specification provided for clarity of the invention. Throughout the various figures, similar elements can be numbered consistently.

Unless otherwise stated, the words “about” and “substantially” as used herein are to be construed as meaning the normal measuring and/or fabrication limitations related to the value or condition which the word “about” or “substantially” modifies. Unless expressly stated otherwise, the term “embodiment” is used herein to mean an embodiment of the present invention. Unless otherwise indicated, all numbers expressing quantities, dimensions, conditions, and so forth used in the specification, drawings, and claims are to be understood as being modified in all instances by the term “about.” The term “a” or “an” entity, as used herein, refers to one or more of that entity. As such, the terms “a” (or “an”), “one or more” and “at least one” can be used interchangeably herein.

The sound of opening a folding knife has been the same “thud” since they were first made. In the knife making/collecting community, there hasn’t been much new innovation, especially with the acoustics of a knife. The invention herein exploits the acoustic characteristics of a folding knife. The knife embodiments described herein use the acoustic properties of knife materials and construction to enhance their desirability and performance and also help identify the type and maker of a particular knife.

The three most popular types of folding knives all use the same type of locking mechanism where the back end of the blade hits a stop pin. In the frame of the knife, an acoustic resonator is milled and cut out closely behind the stop pin. When the backend of the blade hits the stop pin, the impact sends a vibration through the acoustic resonator that was milled and cut out, thus creating a very unique high pitched “ting” sound which is very satisfying and pleasing to the user. The same sound happens when you close the knife and the bottom of the blades hits that same stop pin.

The invention has been described with reference to preferred embodiments without limit thereto. One of skill in the art would realize additional embodiments which are described and set forth in the claims appended hereto.

| COMPONENT NUMBERS IN THE DRAWINGS | |
|---|---|
| 10 | folding knife |
| 12 | blade |
| 14 | frame |
| 16 | pocket |
| 18 | handle scale |
| 20 | acoustic resonator |
| 22 | frame first end |
| 24 | frame second end |
| 26 | pivot pin |
| 28 | stop pin |
| 30 | frame center section |
| 32 | contact point |
| 34 | thumb stud |
| 36 | thumb ramp |
| 38 | arm cutout |
| 40 | frame screw |
| 42 | frame lock |
| 44 | handle screw |
| 46 | lock boss |
| 48 | lock detent |
| 50 | blade schwing face |
| 52 | blade lock face |
| 54 | spacer |
| 56 | acoustic resonator slot |
| 58 | bore |
| 60 | bearing |

A folding knife 10 embodiment shown herein has a mechanism for creating an audible acoustic sound in response to opening and closing the blade. The mechanism has an acoustic resonator 20, similar to a tuning fork, that vibrates at a frequency at-or-near the natural frequency and harmonics of the frame 14. The sound effect, sometimes referred to as “shwing”, “schwing”, “ting” or “ping”, is acoustically similar to the sound effect a Samurai makes when pulling his sword from its sheath or when he strikes another sword. The “Shwing” ringing frequency is typically between 1570 and 2350 Hz. The sound effect will be referred to herein as “shwing”, and for example, can resonate or vibrate between 1570 and 2350 Hz, thereby producing a very satisfying and desirable sound effect upon opening. The acoustic resonator 20 can be cut, formed, or milled into the frame 14, or can be made separately and attached to the knife, to any dimensional specifications required to support vibration at a desired frequency.

One embodiment of the folding knife 10 is illustrated in FIG. 1. Folding knife 10 includes blade 12 which articulates into and out of pocket 16 of frame 14. Blade 12 is pivotally attached to one end of frame 14 so that the cutting surface of blade 12 is contained within frame 14 when the folding knife 10 is in the closed position. In the present illustration, folding knife 10 is shown in the open position. Folding knife 10 includes a frame lock 42 portion of the frame 14 which locks blade 12 into open position when the user articulates the blade to the completely open position. The frame lock 42 also includes a closed lock boss 46 that engages with a closed lock detent 48 disposed on the blade 12 when the user articulates the blade to the completely closed position. Handle scales 18 are sandwiched around both sides of frame 14. Handle scales 18 facilitate gripping and hide moving parts of folding knife 10 which would otherwise be exposed through frame 14.

Figure 2:
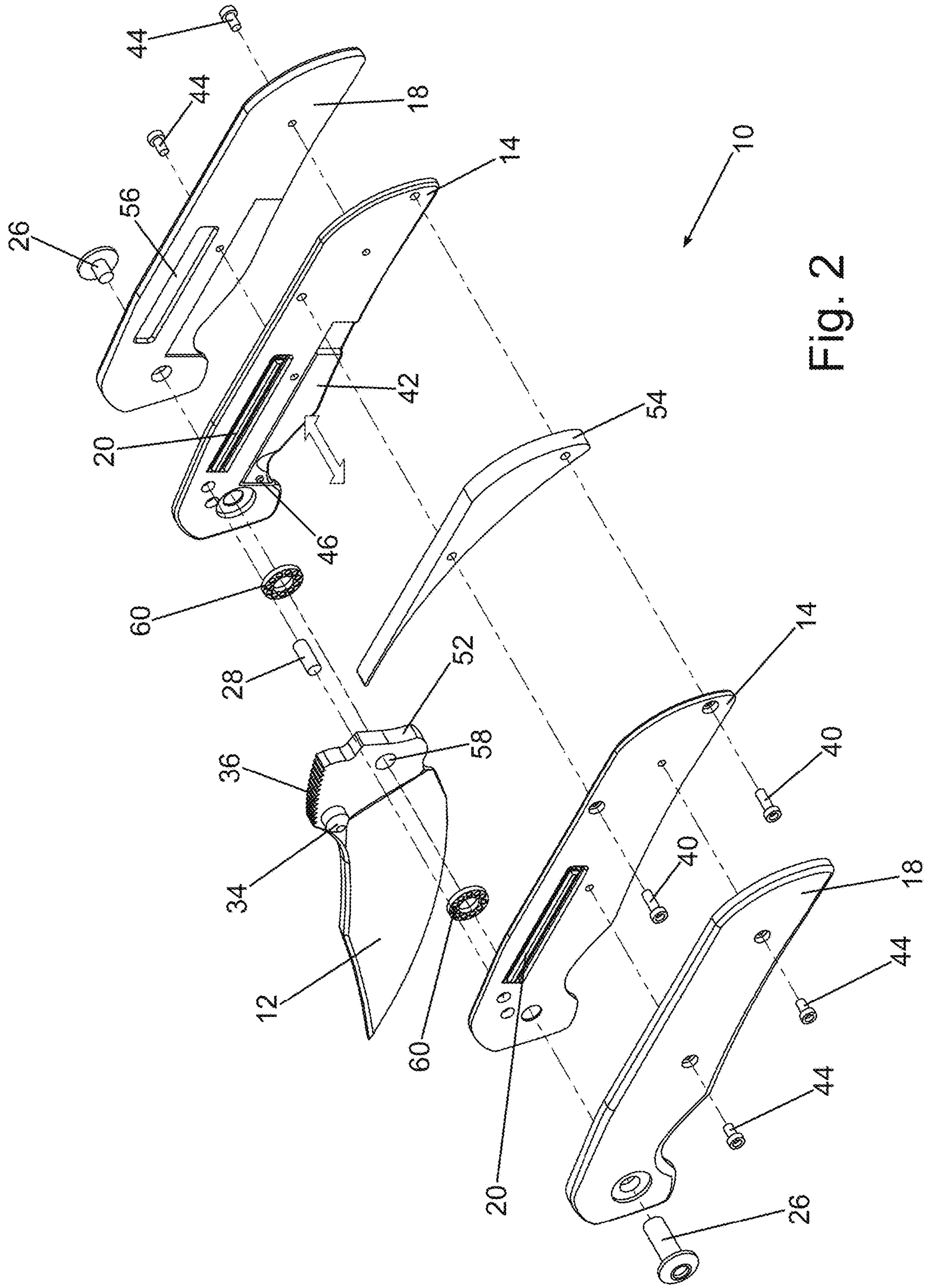
FIG. 2 illustrates an exploded view of a folding knife with acoustic resonator.

An exploded view of folding knife 10 is provided in FIG. 2. The exploded view illustrates the various parts of folding knife 10. Frame 14 is actually composed of three separate pieces—one corresponding to each first and second side of frame 14, and spacer 54 positioned therebetween. When folding knife 10 is assembled, spacer 54, blade 12, acoustic resonator 20, bearings 60, and frame lock 42 are held in place by the side pieces of frame 14. In the assembled state, the acoustic resonator 20 is allowed to freely vibrate in an acoustic resonator slot 20 milled into each handle scale 18. Additional vibration isolating devices, such as washers or bushings, may be added at connect points on the frame for better isolation of the frame from the other knife components. Frame lock 42 is a portion of the frame that is tensioned inward toward the center of the folding knife 10 to maintain fully open position of the blade. This tension on the frame lock 42 also keeps the blade closed with a lock boss 46 and also secures it open on the blade lock face 52. From the open position, frame lock 42 must be urged outward into alignment with frame 14 body to allow rotational movement of the blade 12 into the closed position. Blade 12 is held in position by pivot pin 26 which extends through both sides of the frame and bore 58 provided near the base of blade 12. Handle scales 18 are then attached around frame 14 using handle screws 44.

Figure 3:
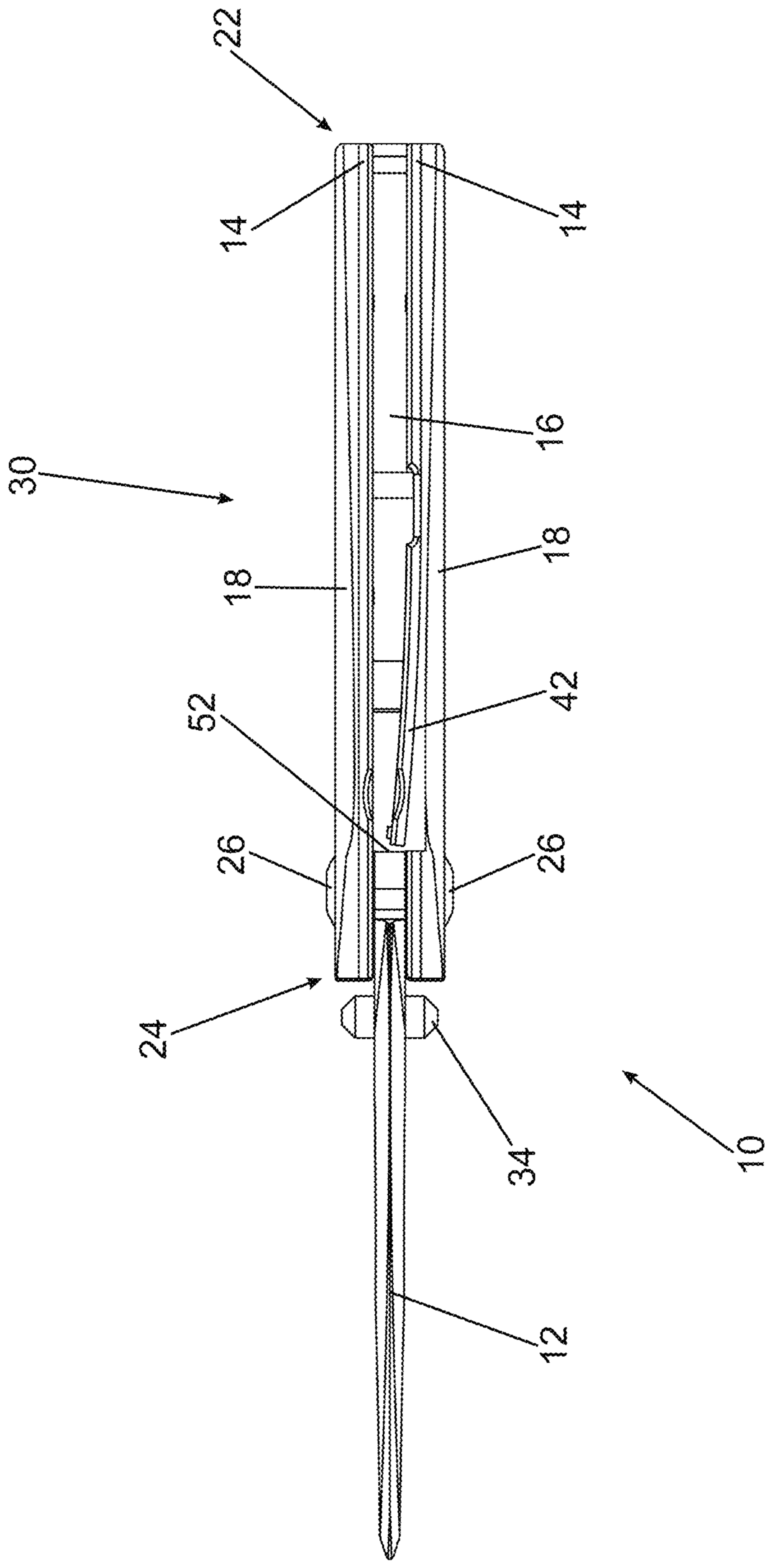
FIG. 3 illustrates a top view of a typical folding knife with acoustic resonator.

FIG. 3 is a bottom view of the folding knife 10 with blade 12 in the open and locked position. Blade lock face 52 is in contact with the frame lock 42 in its “rest” position of being tensioned inward.

Figure 4:
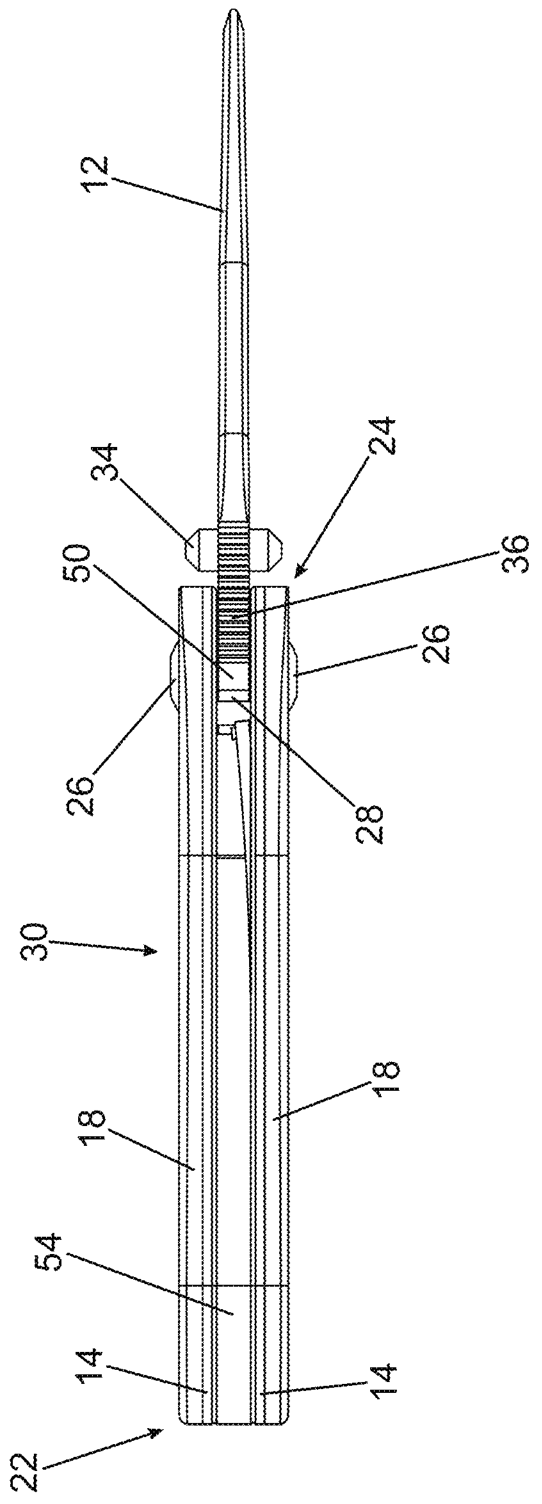
FIG. 4 illustrates a bottom view of a typical folding knife with acoustic resonator.

FIG. 4 is a top view of the folding knife 10 with blade 12 in the open and locked position. Blade schwing face 50 is in contact with the stop pin 28. Upon opening the folding knife 10, initial contact of the stop pin 28 with the blade schwing face 50 imparts vibration through the blade lock 42 into the frame 14 and the at least one acoustic resonator 20 to create an audible shwing noise.

Figure 5:
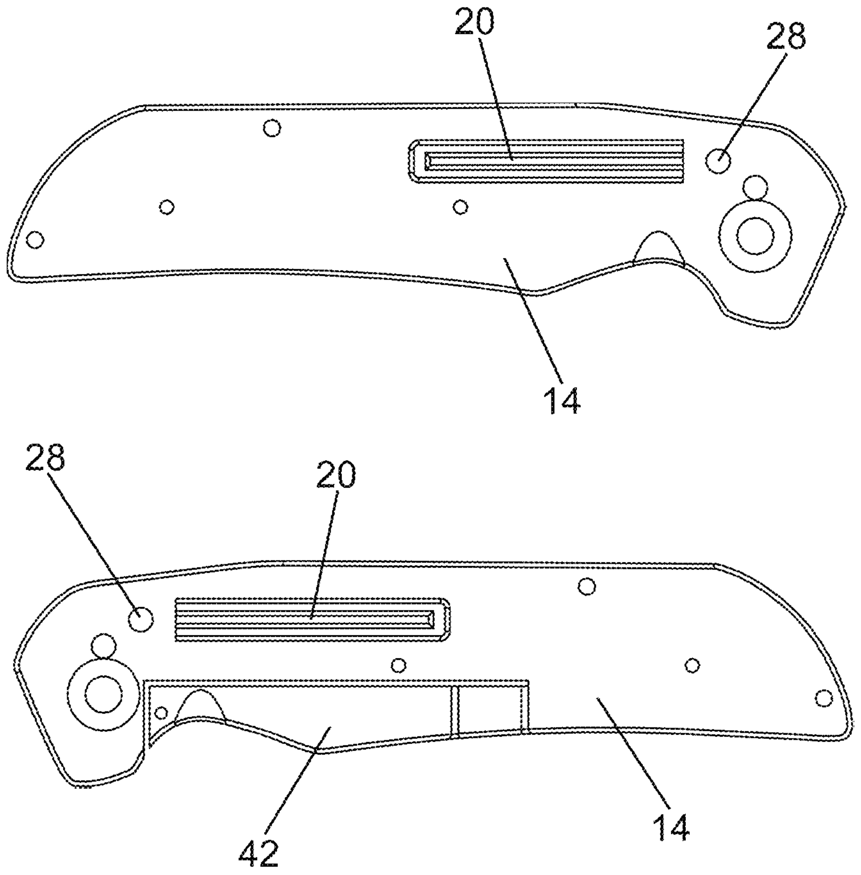
FIG. 5 illustrates the frame portion of a typical folding knife with acoustic resonator.

FIG. 5 illustrates the frame 14 portion of a typical folding knife 10 with acoustic resonator 20.

Figure 6:
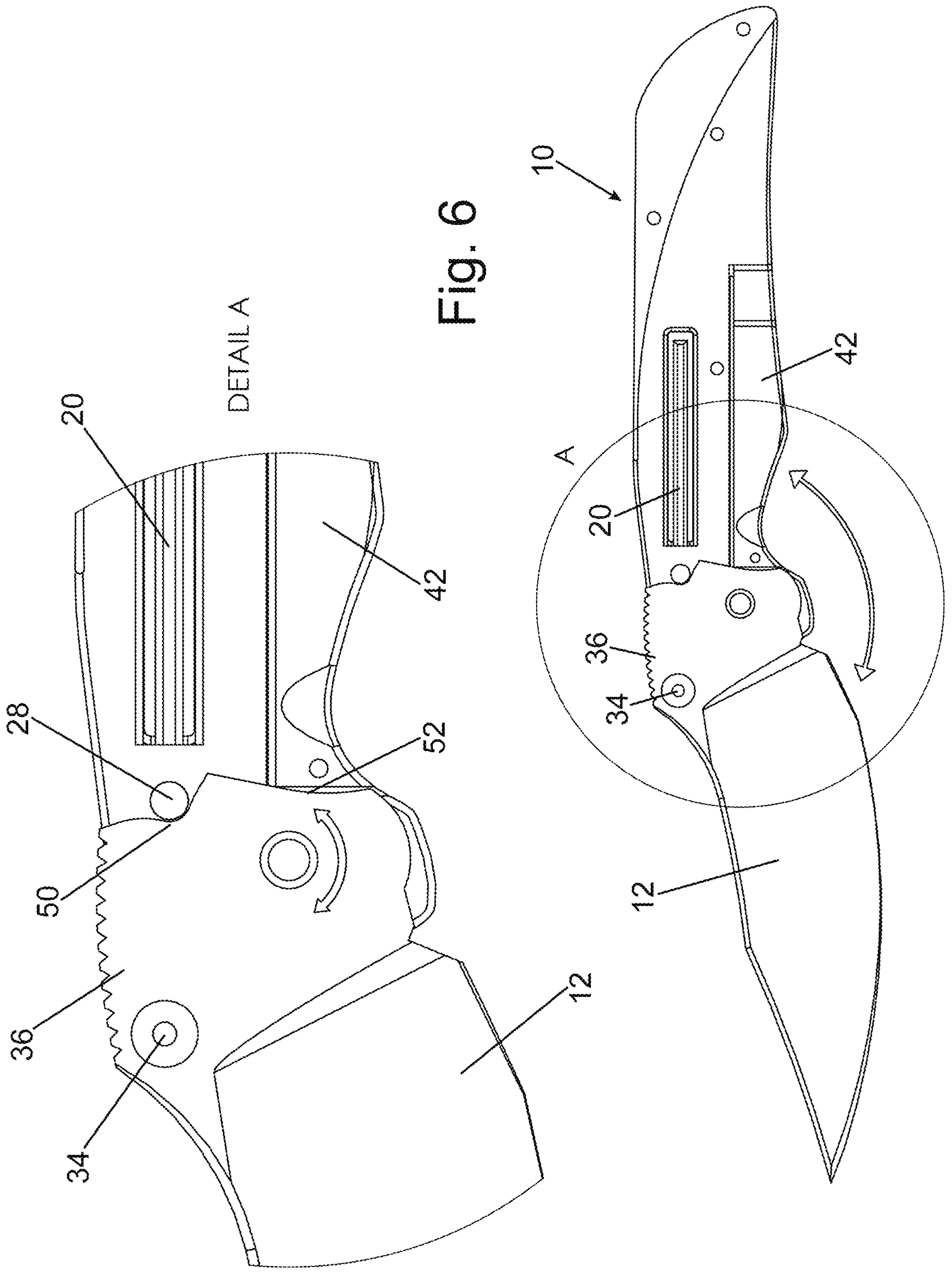
FIG. 6 illustrates the contact between the blade and the stop pin of a typical folding knife with acoustic resonator.

FIG. 6 illustrates the contact between the blade shwing face 50 and the stop pin 28 of a typical folding knife 10 with acoustic resonator 20. Initial contact provides the rotational impact energy necessary to initiate vibration of the acoustic resonator 20. When the blade 12 hits the stop pin 28, the vibration from the impact travels through the frame 14 and the at least one acoustic resonator 20 that can be tuned to the natural frequency or harmonics of the folding knife 10. The acoustic resonator(s) 20 are being actively driven by the external force of opening the blade 12 and striking the stop pin 28 thereby forcing the resonator(s) 20 to vibrate at the natural frequency of the knife system, leading to amplified oscillations that can be heard from a distance. The result is an audible shwing that lasts for about 2-3 seconds as it trails off into silence.

Figure 7:
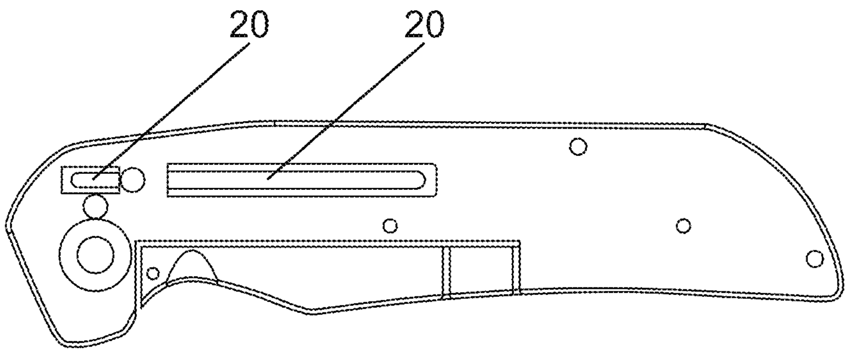
FIGS. 7-9 illustrate various embodiments of the acoustic resonator.
Figure 8:
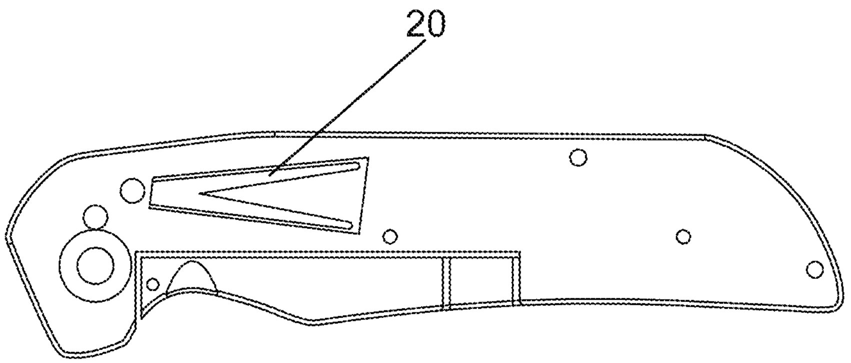
Figure 9:
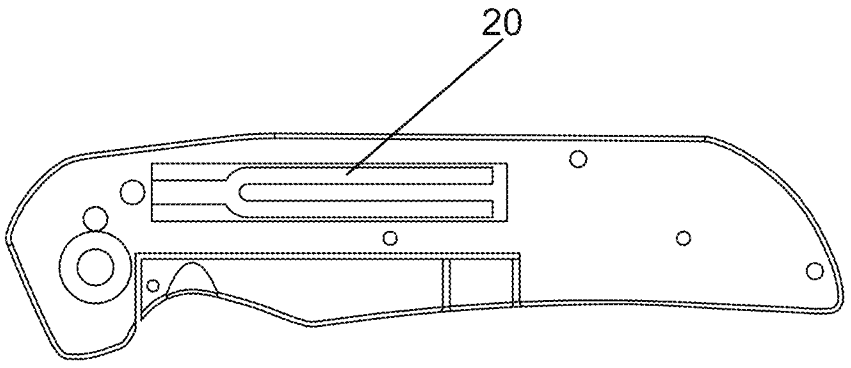

FIGS. 7-9 illustrate additional embodiments of the acoustic resonator including a single tuning bar (FIG. 5), multiple tuning bars (FIG. 7), triangle (FIG. 8), and tuning fork (FIG. 9). Using multiple tuning bars or multiple acoustic resonators allows their vibration at various different harmonic frequencies, or modes of vibration, thereby creating a more unique sound effect.

The various materials that may be used to construct the folding knife components are known to those of skill in the art. In some embodiments, the blade, frame, frame lock, stop pin, and handle scales may be metal, ceramic, plastic, fiberglass, and combinations thereof. The frame lock components are generally comprised of metallic materials such as stainless steel or titanium. However, other materials resistant to compressive forces could be used for the same purpose. Selected materials must also support and amplify sound vibrations from the acoustic resonator.

EXAMPLE: The folding knife frame was modeled to determine the vibration frequency of a rectangular frame with simply supported edges. In this calculation, a rectangular frame, as shown in FIG. 6, with the dimensions a (length)×b (width), thickness s, and a mass m is considered. For the calculation, the elastic modulus E ($1.7\times10^7$ psi) and Poisson's ratio v (0.32) of the frame are the values for titanium metal. As a result of calculations, the natural vibration frequency f (Hz) of the frame is determined for the first vibration mode:

$$f = [\pi^2 * [1 + (b/a)^2]] * [[Es^3/12(1-v^2)] * [a/(m*b^3)]]]^{0.5}$$

where: Length (a)=4.25 inches or 107.95 mm
- Width (b)=0.875 inches or ⅞ inches or 22.25 mm
- Thickness(s)=0.0625 inches or 1/16 inch or 1.5875 mm
- Frame mass (m)=0.0375 lb or 0.6 ounces or 0.017 kg
- Young's modulus (E)=17000000 psi or $1.16\times10^{11}$ Pa
- Poisson's ratio (v)=0.32

In this example, the frame's natural frequency of the first mode is calculated to be f=2626 Hz.

Acoustic resonators, such as tuning forks, acoustically resonate at a fixed pitch. In general, the following formula can be used to determine the frequency of a given tuning fork:

$$f = [3.516/2\pi l^2] * [a^2E/12\rho]^{0.5}$$

where: f=the frequency the fork vibrates (Hz);
- 3.516 is the square of the smallest positive solution of cos×cos h×of −1, which arises from the boundary conditions of the prong's cantilevered structure;
- I=length of the prongs (m);
- E=Young's modulus of the material (Pa)=$1.16\times10^{11}$ titanium
- a=edge of the square area A of the prong cross-section (m); =0.0015875 m
- ρ=density of the material ($kg/m^3$)=4500 $kg/m^3$ Now, solving for I, yields:

$$l = [[3.516/2\pi f] * [a^2E/12\rho]^{0.5}]^{0.5}$$

To construct the acoustic resonator, tuning bar, or tuning fork so that it vibrates at the natural frequency of the frame, we set the tuning fork frequency f to match the natural frequency of the frame, which is 2626 Hz in this example. Then we calculate the length I of the prongs to be milled into the frame. In this example, a=0.0015875 meters or 0.0625 inches which is the thickness of the frame, and titanium density=4500 $kg/m^3$, to arrive at a prong length I of 0.022 meters or 0.88 inches. The acoustic resonator is then cut, formed, or milled into one or both sides of the frame with each prong length being 0.86 inches and the handle length being I/2 or 0.44 inches.

Acoustic resonators such as a tuning bar configuration can be analyzed as a simply supported cantilevered beam that is fixed from one end and the other end is free. The formula used for this type of cantilever beam natural frequency calculations is:

$$f = (36*\pi^2/L^2)(EI_{xx}g/w)^{0.5}$$

where: f—Natural Frequency (Hz)=2626
- L—Beam length—(inches)=0.40
- $I_{xx}$—Area moment of inertia of the beam in the x direction of vibration—(in4)=1.56×10-5
- E—Young's modulus—(psi)=1.70×107
- w—Weight per unit area of beam (lb/in2) or [material density (lb/in3)×beam leg base (in)]=0.01
- g—Gravitational Constant ($in/sec^2$)=386
- B—Beam leg base dimension—(in)=0.0625
- H—beam leg height dimension—(in)=0.0625

Now, solving for L yields:

$$L = (((36*\pi^2)*(EI_{xx}g/w))^{0.5}/f))^{0.5}$$

Using the same 2626 Hz frame natural frequency and the area moment of inertia formula for a square (rectangle) with square dimensions of the titanium frame thickness of (0.0625 inches), the length L of the tuning bar is calculated to be 0.4 inches.

Upon opening or closing the knife, the blade strikes the stop pin and the vibration from the impact travels to the acoustic resonator to vibrate at the natural or resonant frequency of the frame. Then, the frame amplifies the natural frequency generated by the acoustic resonator.

These calculations can be adapted to determine acoustic resonator dimensions for a tuning fork, tuning bar, triangle or other configurations of vibrating acoustic resonators for the design and manufacturing of additional embodiments of the folding knife having different materials and dimensions. Other acoustic resonator dimensions can be used that do not match the natural frequency of the frames, however the amplitude or volume of the sound emanating from the folding knife will be lower.

Existing knives can be modified, or new knives can be constructed by locating the stop pin (or lock pin) hole in the frame and drawing at least two parallel lines on each side of the frame at feast 1/16 of an inch away from the stop pin. The at least two parallel lines can be any length (or frequency) desired for the acoustic resonator (tuning fork) or can be sized to match the natural frequency of the frame. The lines can be the same length. Then, cut out the entire length of the at least two lines completely through both sides of the frame. Then, thin down the material that is left between the lines. Once the space between the cut-out lines is thinned down to the desired thickness, go to the end of the lines furthest away from the stop pin and cut the width for the entire distance between connecting the cut lines. This frees up the end of the tuning bar (or tuning fork) furthest away from the stop pin. Then reconstruct the knife to impact the stop pin upon opening and closing and create the desired sound from the acoustic resonator for transmitting to the frame for amplification.

The shape of the acoustic resonator can be configured in any geometric shape that supports the desired frequency of vibration. One acoustic resonator shown in the figures is a tuning bar having a single leg and no handle. Another suitable shape is a typical tuning fork having two vibrating legs and a handle. Another suitable shape is a triangle. These various acoustic resonator embodiments can be integrated with the frame material or can be separate devices, of a different or the same material, mounted to the knife and configured for creating an audible acoustic sound in response to opening and closing the blade of the knife. Yet another configuration can be built similar to a mechanical music box, making the sound effect by the blade motion plucking the teeth of an acoustic resonator such as a “steel comb” tuned to the desired frequencies.

The impact of the blade on the stop pin can be increased using assisted opening mechanisms on the folding knife. Assisted opening knives open faster than a manual but would circumvent the strict Federal Switchblade Act of 1958 that governs push-button automatic knives. An assisted-opening knife is a type of folding knife which uses an internal mechanism to finish the opening of the blade once the user has partially opened it using a flipper or thumb stud attached to the blade.

When the knife is in the closed position, the blade is held in place by means of torsion springs and an additional blade lock (optional). As the user applies manual pressure to the thumb stud to open the knife, a mechanism such as a torsion spring moves along a track in the liner and rapidly rotates the blade into the open and locked position, thereby applying additional impact force on the stop pin for increased vibration of the acoustic resonator. Because assisted knives open with a flipper or thumb stud, they typically are not considered automatic knives or switchblades in many legal jurisdictions and come in different varieties.

In one variety, the blade is held under a constant spring force while the blade is in the folded position within the pocket of the liner. The blade is held in place by some form of lock, typically some form of button. When the lock is released, the blade rapidly flips to the extended position by the action of the spring. Such knives, commonly called switchblades, may be illegal to sell and possess in many jurisdictions.

Trade names for assisted opening knives include Forward Action Spring Technology, A/O Knife, Torsion Assist Knife, Assisted Knife, Spring Assist Knife, Spring Assisted Knife, Quick Release, Quick Draw, Alternative Automatic, Outburst, SpeedSafe, Blade Launcher, S.A.T (SOG Assisted Technology), and the Semi-Auto. Embodiments of the invention can utilize any of these assisted opening features.

The construction and the arrangements of the examples shown in the figures and described herein are illustrative only. Although only a single embodiment has been described in detail in this disclosure, many modifications are possible (e.g., variations in sizes, dimensions, structures, shapes and proportions of the various elements, values of parameters, mounting arrangements, use of materials, colors, orientations, etc.). Further, the positions of elements may be reversed or otherwise varied, and the nature or number of discreet elements or positions may be altered or varied. Accordingly, all such modifications are intended to be included within the scope of the present application. Other substitutions, modifications, changes, and omissions may be made in the design, operating conditions, and arrangement of the exemplary embodiments without departing from the scope of the present application.

The invention claimed is:

1. A folding knife, comprising:

a frame having a first side, a second side, an open top leading to a pocket, a bottom, a first end, a second end, and a center section therebetween, the first side and the second side defining respective pivot openings aligned with each other proximate the second end of the frame, a stop pin disposed proximate said second end of said frame, the stop pin being in vibrational contact with said first side and said second side of said frame;

a blade having a pointed end and a base end, said base end pivotally secured to said second end of the frame by a pivot pin pivoting in the pivot openings such that said blade is capable of pivoting between a closed position wherein said blade is received within said pocket and an open position wherein said blade pivots out of said pocket through said open top and extends outwardly from said second end of the frame, the blade having a shoulder which contacts the stop pin when the blade is in the open position;

a frame lock mechanism attached to the frame and which when engaged is configured for selectively securing the blade against pivoting from either of the closed position or the open position; and at least one acoustic resonator extending from the frame, the acoustic resonator having a proximal end proximate the stop pin and a distal end extending along the frame away from the stop pin, a length of the acoustic resonator between the proximal end and the distal end being selected in view of a natural vibration frequency of the frame so that the acoustic resonator vibrates and produces an audible shwing sound effect in response to impact of said shoulder of the blade with said stop pin when the blade is moved to the open position.

2. The folding knife of claim 1, wherein said audible shwing sound effect is generated when the blade strikes the stop pin and the vibration from the impact travels to the at least one acoustic resonator and through the frame.

3. The folding knife of claim 1, wherein the at least one acoustic resonator is tuned to a natural frequency and harmonics of the frame.

4. The folding knife of claim 1, wherein said frame lock further comprises a closed lock boss configured to engage with a closed lock detent disposed on the blade, when the blade articulates to the closed position.

5. The folding knife of claim 1, further comprising assisted opening.

6. The folding knife of claim 1, wherein the at least one acoustic resonator comprises at least one geometric shape selected from the group consisting of a tuning bar, a tuning fork, a triangle, and combinations thereof.

7. The folding knife of claim 1, wherein the at least one acoustic resonator is a separate device attached to the folding knife.

8. The folding knife of claim 1, wherein the audible shwing sound effect comprises a frequency between 1570 and 2350 Hz.

9. The folding knife of claim 1, further comprising handle scales sandwiched around both sides of frame, wherein each handle scale comprises an acoustic resonator slot adjacent the at least one acoustic resonator.

10. The folding knife of claim 1, comprising materials selected from metal, ceramic, plastic, fiberglass, and combinations thereof.

11. The folding knife of claim 1, wherein the at least one acoustic resonator is formed integral with the frame.

12. The folding knife of claim 1, wherein the at least one acoustic resonator contacts the frame only at the proximal end.

13. The folding knife of claim 1, wherein the at least one acoustic resonator comprises two of the acoustic resonators, each of the acoustic resonators extending from a respective one of the first side of the frame or the second side of the frame.

* * * * *